United States Patent [19]

Goldsworthy

[11] Patent Number: 4,495,021

[45] Date of Patent: Jan. 22, 1985

[54] APPARATUS FOR PRODUCING FIBER REINFORCED PLASTIC SHEET STRUCTURES

[75] Inventor: William B. Goldsworthy, Ranchos Palos Verdes, Calif.

[73] Assignee: Goldsworthy Engineering, Inc., Torrance, Calif.

[21] Appl. No.: 535,909

[22] Filed: Sep. 26, 1983

Related U.S. Application Data

[62] Division of Ser. No. 290,358, Dec. 11, 1981, Pat. No. 4,420,359.

[51] Int. Cl.³ .............................................. B65H 81/00
[52] U.S. Cl. ................................... 156/425; 156/172; 156/428; 156/430; 156/443; 156/458; 156/468; 156/499; 156/510
[58] Field of Search ............... 156/172, 428, 430, 445, 156/458, 468, 443, 499, 510

[56] References Cited

U.S. PATENT DOCUMENTS

| | | | |
|---|---|---|---|
| 3,393,918 | 7/1968 | Styka | 156/172 |
| 3,617,421 | 11/1971 | Gray et al. | 156/428 |
| 3,695,968 | 10/1972 | Morrison | 156/172 |
| 4,090,910 | 5/1978 | Metzler | 156/430 |
| 4,197,348 | 4/1980 | Townsend | 156/172 |

Primary Examiner—Caleb Weston
Attorney, Agent, or Firm—Robert J. Schaap

[57] ABSTRACT

Apparatus for producing reinforced plastic sheets and reinforced plastic sheet laminate structures on a high speed continuous basis and which sheets and laminate structures may have widths ranging from relatively narrow to very wide. The apparatus comprises a means for bringing one or more layers of resin impregnated, fiber-containing, reinforced plastic composite material into contact with each other or into contact with surfaces of one or more endwise abutted relatively flat panels.

13 Claims, 14 Drawing Figures

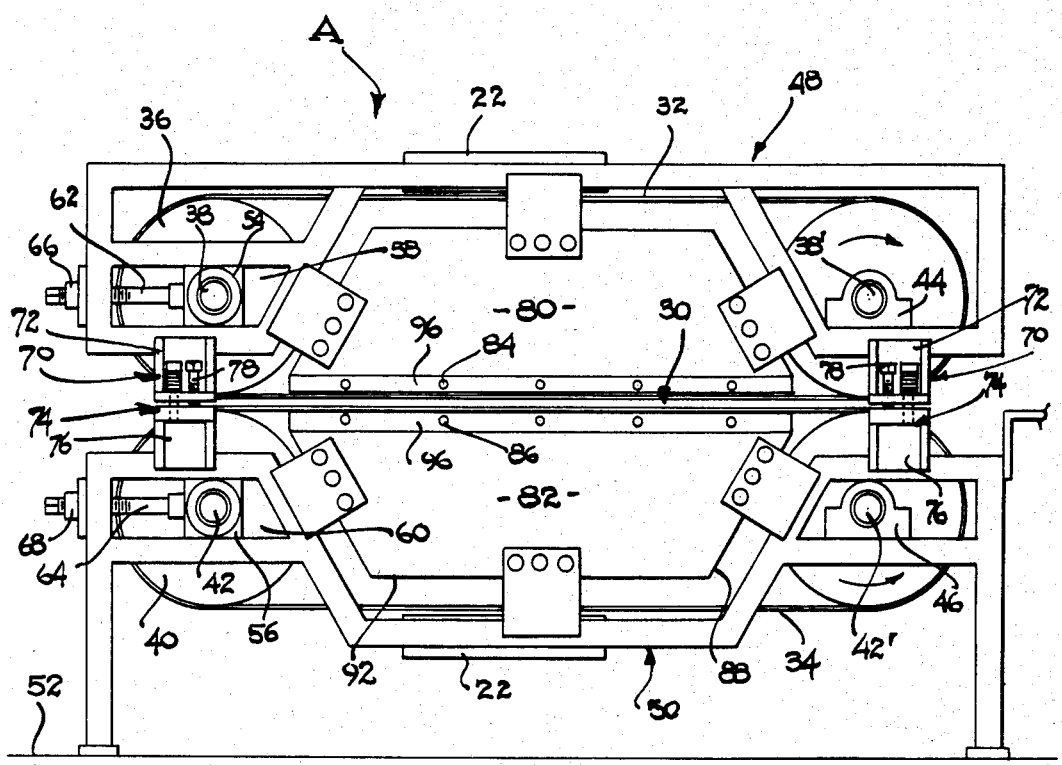
Fig. 2
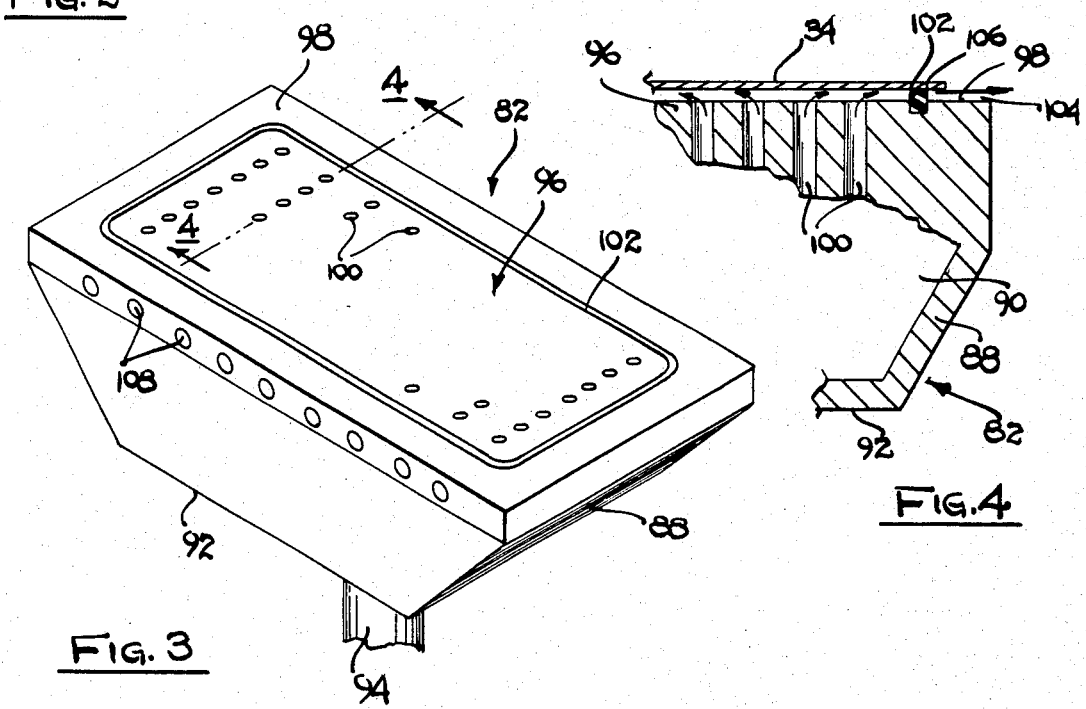
Fig. 3
Fig. 4

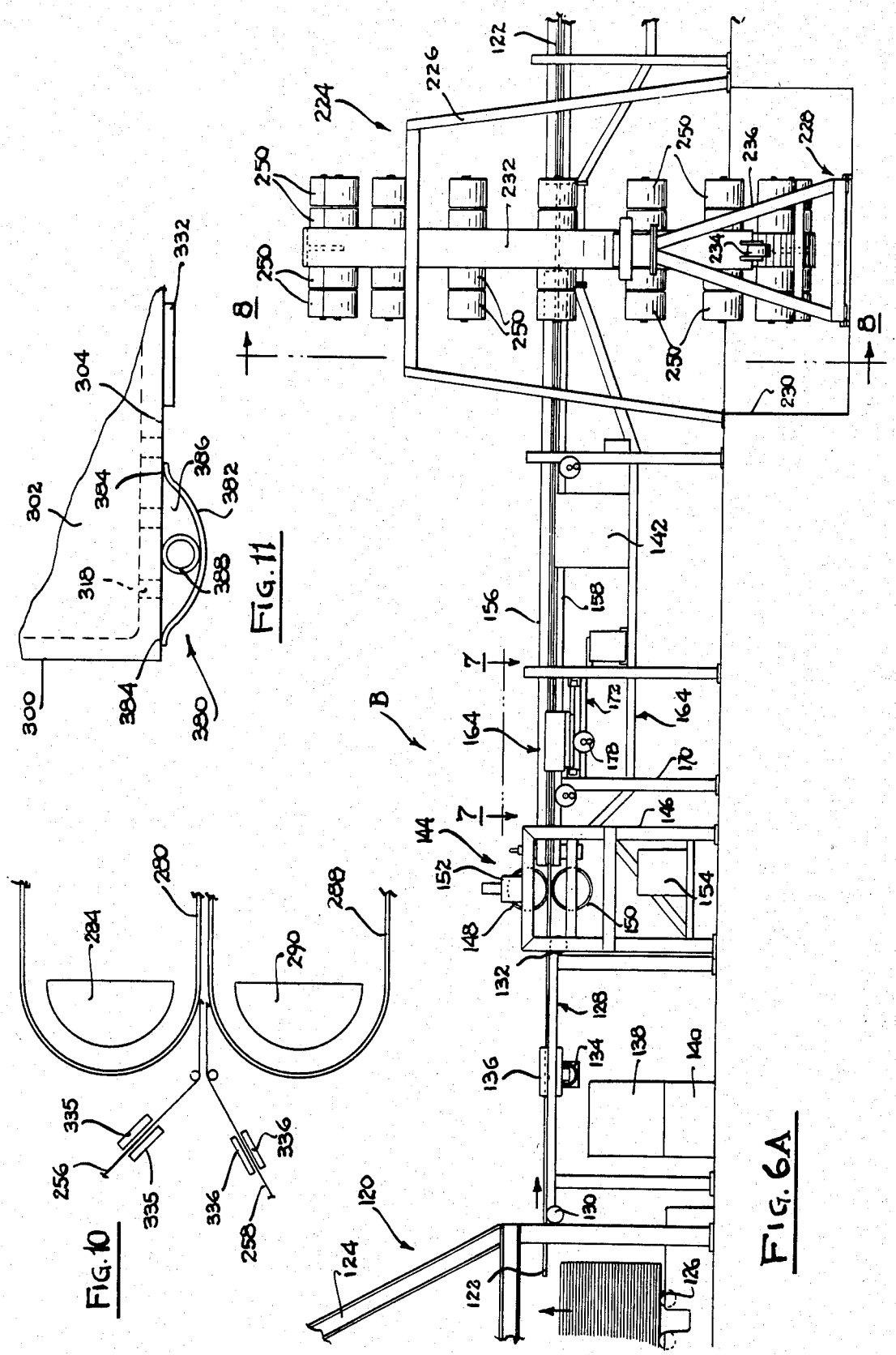

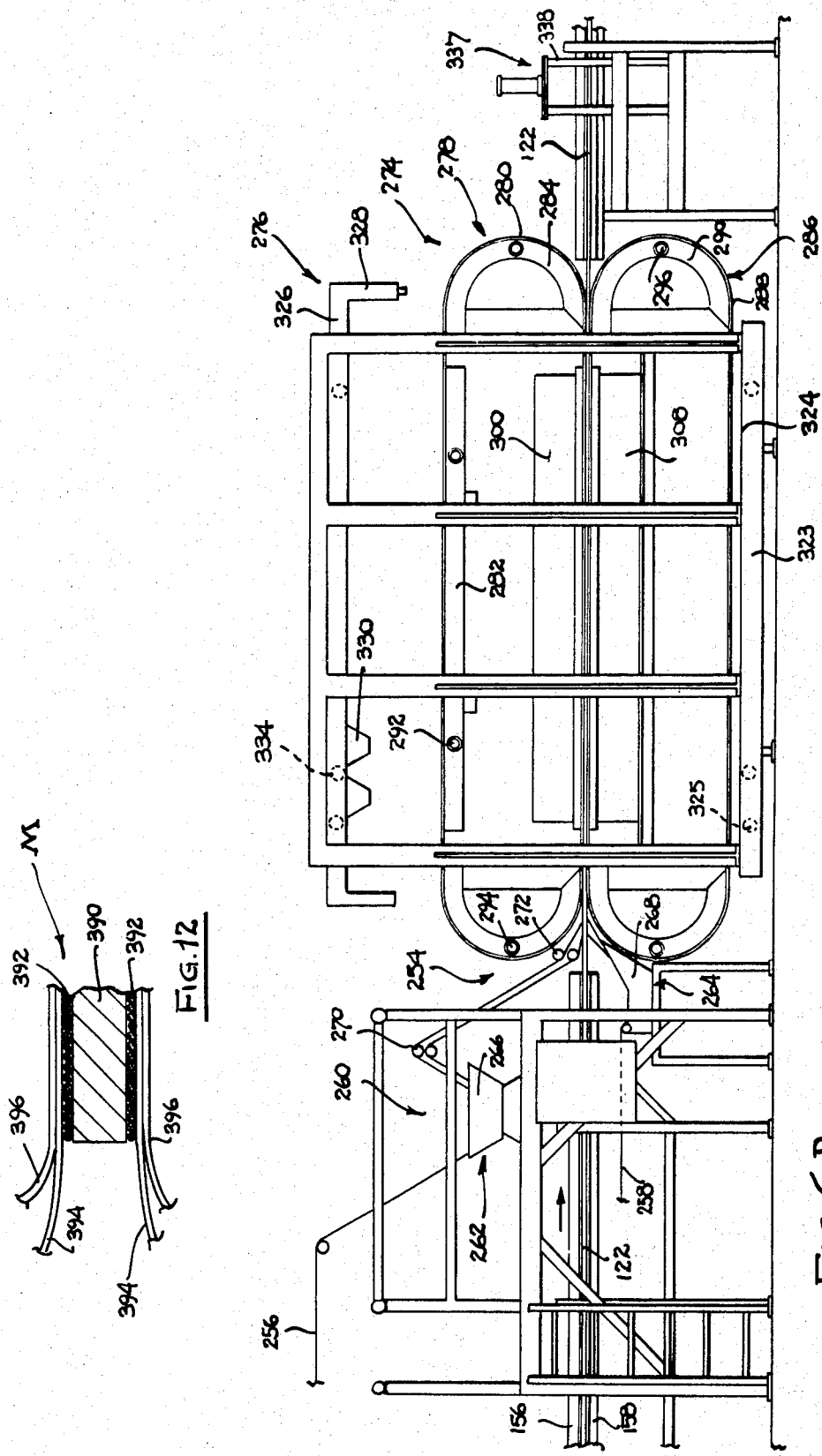

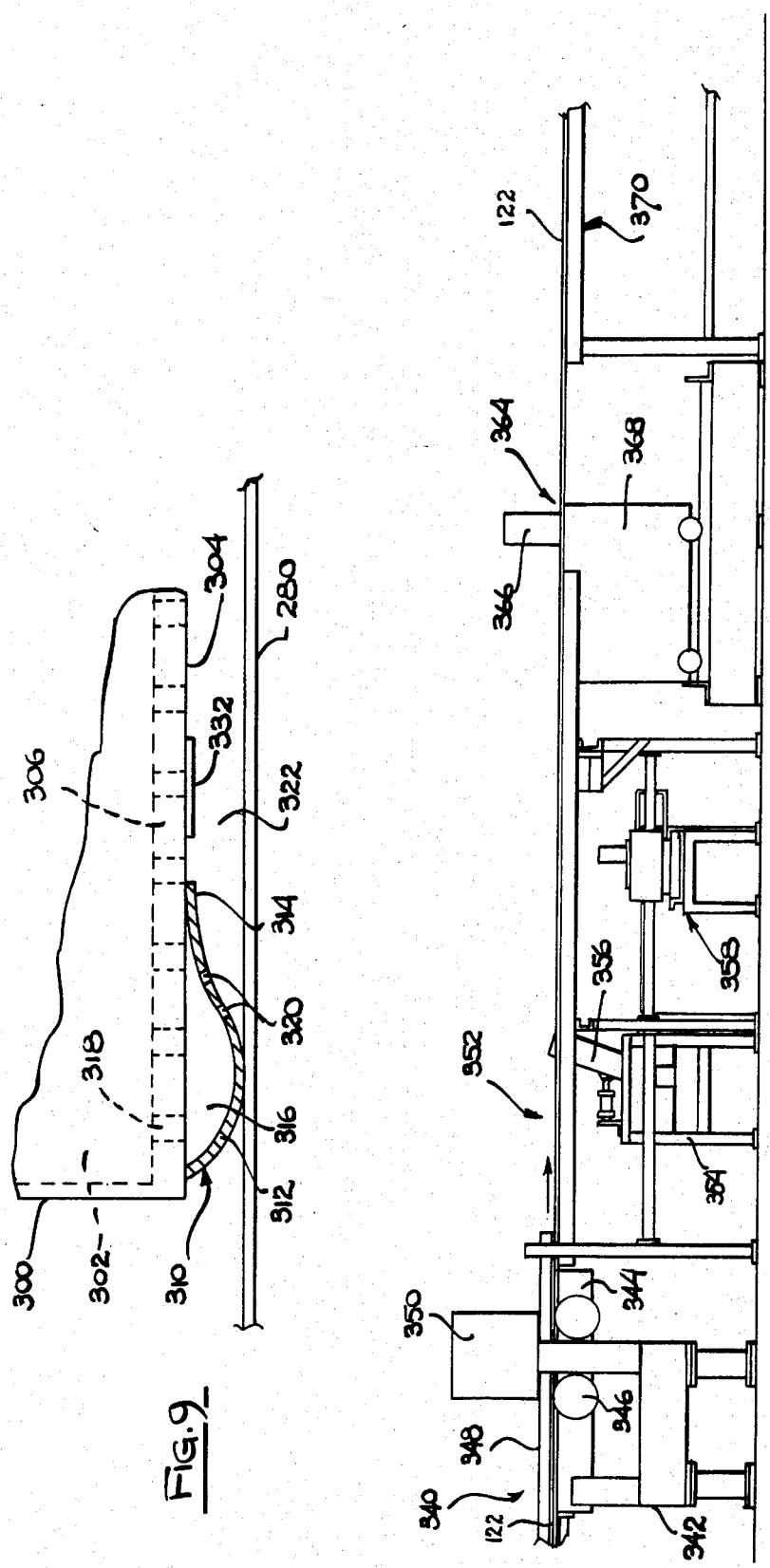

APPARATUS FOR PRODUCING FIBER REINFORCED PLASTIC SHEET STRUCTURES

RELATED APPLICATION

This application is a divisional of application Ser. No. 290,358 filed Dec. 11, 1981, now U.S. Pat. No. 4,420,359.

BACKGROUND OF THE INVENTION

1. Field of the Invention

The present invention relates in general to certain new and useful improvements in apparatus for producing reinforced plastic sheets and reinforced plastic laminated structures, and more particularly, to apparatus for producing reinforced plastic sheets and laminated structures having fiber reinforced plastic components included therein, and which relies upon moving belts engaging the components and air or other gas under pressure creating a pocket to support the belts to facilitate the laminating or curing operation or both.

2. Brief Description of the Prior Art

In recent years, reinforced plastics have achieved increasing prominence and have found applications in many areas which were previously satisfied by products fabricated of heavy metal and other structural materials. Furthermore, improved raw material prices and increased availability of reinforced plastic materials has favored the use of reinforced plastic materials in the production of rigid flat sheets and plastic sheet laminates and structural members. It is well known in the reinforced plastic composites industry that flat fiberglass reinforced plastic panels can be produced by curing a resin matrix impregnated into fiber-containing reinforcing material. Flat reinforced plastic panels can be produced by a laminable procedure in which one or a plurality of the resin impregnated fiberglass sheets are laminated in juxtaposition, and then cured in a large oven or curing device.

These reinforced plastic sheets and the laminate structures which include at least one reinforced plastic composite layer as well as a rigid panel laminated to each other are often referred to as reinforced plastic flat sheet structures or reinforced plastic flat sheet laminate structures. One such device for producing these structures is more fully illustrated and described in U.S. Pat. No. 3,801,407, dated Apr. 2, 1974, to Goldsworthy et al. In this, as well as other apparatus and method for producing reinforced composite flat sheet structures, at least one or more fiber-reinforced resin-impregnated layers is brought into facewise contact with a relatively rigid panel, as for example, a plywood or similar panel. These laminable layers are then compressed between one or more pairs of opposed rollers. These rollers serve as the primary force to urge the laminable members into intimate contact with one another. Thereafter, the reinforced plastic layer is subjected to a curing environment in which the resin matrix, which is impregnated in the fibers contained in the fiber-containing reinforced plastic layer, are cured and which simultaneously bond to the rigid panel, such as a plywood sheet.

It has been found that reinforced plastic sheet structures of this type can find a wide variety of uses as substitutes for considerably more expensive rigid sheet structures. These reinforced sheet structures can find use in many forms of industries, particularly in the construction of buildings, as for example, side walls of houses and the like. These structures can be used in building bulkheads in ships, in the fabrication of trailer bodies and intermodal containers and in like structures. Moreover, and of significant importance, is the fact that reinforced laminate sheet structures of this type can be produced by using relatively low grades of rigid panels. Consequently, it is possible to produce very low-cost rigid structures by the apparatus and method of the present invention.

One of the principal problems in creating these flat sheet laminate structures is that it is necessary to obtain even contact with generally uniform pressure of the reinforced plastic composite layer on the rigid panel across the bonding surface thereof, or otherwise a lack of uniform bonding will result. Previously, the prior art techniques for producing such structures employed various means of bringing the one or more reinforced plastic sheets into contact with the rigid panel, as for example, by the use of roller bearings or flat platens which force the juxtaposed laminable members into contact with each other. However, these prior art techniques did not resolve the problem of uneven bonding which resulted in structurally and aesthetically inferior products.

A similar problem arises in the production of reinforced plastic sheets which are not laminated to a rigid panel. In this case, the resin impregnated in one or more layers of fiber-containing material, such as roving strands, tapes or woven or nonwoven sheet material is cured to form a rigid sheet. However, it is necessary to employ substantial and continuous and even pressure across the sheet of material during the curing process to provide a sheet with the desired strength and physical properties. The apparatus of the prior art were also not effective for this purpose since they did not offer a mechanism to apply the continuous and even pressure during the laminating process. Further, the prior art devices were capable of applying pressure to limited transverse cross section areas and were not adapted to apply uniform pressure across the transverse dimension and a substantial segment lengthwise of the laminable members.

One of the other problems encountered in the prior art techniques of producing reinforced plastic flat sheet structures was the fact that excess heat was applied to the one or more layers or members of the laminate structure during the production thereof which resulted in boiling of the resin matrix around the edges of the sheets. Consequently, in many of the prior art attempts to produce the reinforced plastic structures, volatilization of the resin matrix occurred which resulted in the premature curing of the flat sheet structure with the resultant significant reduction in inherent strength in the final product, as well as the aesthetic appearance thereof.

U.S. Pat. No. 3,674,601, dated July 4, 1972, teaches of an augmented curing system for pultruded reinforced plastic stock. In this apparatus, a cure of the thermosetting resin impregnated in the fiber containing strands is initiated in an initial curing stage. Before final curing the stock is pulled through a die which is externally heated so that the stock is cured to completion. However, this augmented curing mechanism was not effectively used in producing flat sheet materials.

The present invention obviates these and other problems in providing an apparatus and method which provides uniform contact and relatively uniform pressure to the surfaces of the laminable members during the manufacture thereof, also avoids any excessive heat generation and a means for providing a protective surface film thereon.

OBJECTS OF THE INVENTION

It is, therefore, a primary object of the present invention to provide an apparatus for producing fiber-containing, reinforced plastic sheet structures in a high speed continuous operation and which apparatus is constructed to maintain relatively uniform contact and pressure on the flat surfaces of each of the sheet structures during the processing thereof.

It is another object of the present invention to provide an apparatus for producing reinforced plastic sheet structures of the type stated which generates a pressurized gaseous body to maintain constant and uniform pressure across the various sheet members during the production of the sheet structures.

It is also an object of the present invention to provide an apparatus of the type stated in which continuous belts are designed to engage opposed surfaces of the laminable sheet members which produce the ultimate laminate structure and which are biased into such uniform contact with the various sheet members by means of partially confined chamber which provides a pressured gaseous body.

It is a further object of the present invention to provide an apparatus of the type stated which is capable of producing a laminable sheet structure which may be produced from different types of laminable sheet members and which may be made in several sizes and shapes.

It is an additional object of the present invention to provide an apparatus for producing reinforced plastic sheet structures of the type stated which requires only a relatively small amount of manual attention and where such structures can be produced on a high speed and economical basis.

It is another salient object of the present invention to provide an apparatus of the type stated which is designed to create a pressurized body of air within a plenum housing and against a continuous belt moving around the housing which is biased by the body of air into contact with one of the laminable members in the structure.

It is still a further object of the present invention to provide an apparatus of the type stated in which a curable binder, impregnated in or in contact with the one or more fiber-containing, reinforced plastic sheets, may be pre-cured by a precurer and then passed between belts forced into contact with the laminable members by a uniform body of pressurized air and where means is on said apparatus to provide for further curing during the passage between said belts.

With the above and other objects in view, my invention resides in the novel features of form, construction, arrangement combination of parts presently described and pointed out in the claims.

SUMMARY OF THE DISCLOSURE

Generally speaking, the present invention resides in an apparatus constructed to enable the continuous high speed production of reinforced plastic flat sheet structures. The flat sheet structures may be comprised of a single layer of fiber-containing material impregnated with a suitable binder such as a resin matrix which may be cured by the application of a proper radiation thereto. In addition, the flat sheet structures may be comprised of two or more layers of fiber-containing material. When the binder or resin matrix is used in the single layer, the material becomes a hard relatively flat sheet. When the binder or resin matrix is used in the superposed plural layer form, the various layers become bonded together and form a hard relatively flat sheet structure.

The flat sheet structures may be in the form of reinforced plastic flat sheet laminate structures produced by laminating one or more marginally registered fiber-containing resin impregnated reinforced plastic laminate sheets to a rigid panel. In a preferred aspect, the apparatus is constructed to laminate fiber-containing resin impregnated reinforced plastic sheets together or otherwise to both of the opposite flat surfaces of a rigid panel in order to produce the laminable structures.

In my copending application for Letters Patent of the United States, filed contemporaneously with this present application, there is described several preferred embodiments of a method suitable for producing the flat sheet structures as described herein and which methods may use the apparatus of this application. However, to the extent that the description of the embodiment of the method is pertinent to the understanding of the construction and operation of the apparatus as described and claimed herein, that description of the method is set forth herein.

In one embodiment, the apparatus comprises mean for drawing a reinforced plastic fiber-containing layer or sheet, as for example, a fiberglass mat or web, or a plurality of strands thereof, through a resin impregnating tank where the mat or web or strands are impregnated with a suitable curable resin matrix. The tank may be conventionally provided with doctor blades, or similar mechanism, for removing the excess resin from the impregnated fiber-containing sheet. The apparatus is provided with means for bringing the sheet into incidental relationship with a surface of a rigid panel and, typically, into contact with a flat surface of a rigid panel. In a preferred aspect the apparatus comprises a means for bringing a similar reinforced plastic fiber-containing sheet into contact with the opposite flat surface of the rigid panel.

The resin impregnated fiber-containing sheet or sheets may adopt the form of a plurality of strands of reinforced plastic composite materials, or otherwise, may adopt the form of a woven or non-woven sheet. When the sheet structure is a laminate of two or more layers of fiber-containing material, the materials may be in the same form, e.g. woven sheets or in different forms, e.g. a non-woven sheet and a plurality of strands. The same holds true when the layers are bonded or laminated to a rigid panel.

The terms "filament containing" or "fiber containing" with reference to reinforcing material and similar terms merely imply that the reinforcing material, whether separate or incorporated in the composite article, is comprised only of fibers or filaments, or that a very substantial portion of the material is comprised of fibers or filaments (when not impregnated or coated with a binder such as a resin matrix). Thus, for example, a smaller portion of the reinforcing material could be comprised of non-filament or non-fiber materials such as wires or the like as hereinafter described.

The rigid panel may be formed of any of a number of suitable materials including metals, wood and the like. One of the most typical materials would be wood, and preferably low-grade plywood. However, a number of rigid panels which may be used in the present invention are hereinafter described in more detail.

The fiber reinforced plastic sheets which may be pre-woven sheets of material or otherwise a combination of woven strands, as hereinafter described, constitute the basic components of the reinforced plastic sheets when impregnated with a suitable binder such as a resin matrix. In the embodiment of the invention where these sheets are laminated to one another or laminated to a rigid panel, a cure of the resin matrix may be initiated such that the resin does not proceed to a final cure until the method is completed, as hereinafter described. Thus, in one of the preferred aspects of the invention, the resin impregnated sheets of fiber containing reinforcing material are pulled through or otherwise pushed through a pre-curing oven, which applies radiation sufficient to at least initiate a cure of the resin matrix impregnated in the sheets. The oven is preferably capable of generating radio frequency radiation or a microwave radiation in order to initate a cure of the resin matrix.

The resin matrix curing oven is designed to apply a proper amount of radiation consistent with the speed of movement of the laminable members through the apparatus so that a cure of the resin matrix is only initiated and also so that the resin matrix is not finally cured into a rigid stage before each of the laminable components passes through the apparatus as hereinafter described. Thus, the energy level provided by the curing mechanism is established at a level to raise the resin matrix to a point below the curing level but not at a level to cure the matrix per-se. In other words, the cure of the resin matrix is only initiated and which will thereafter exothermically proceed to a final cure.

In one of the preferred embodiments of the invention, the fiber containing reinforced sheets of material are disposed in contact with one or more opposite flat surfaces of a rigid panel, and together with the rigid panel, constitute the major components of the laminated structure. These panels are preferably abutted against one another with each of the panels having the same overall thickness. The sheets of reinforced plastic composite material may be either pre-woven or pre-formed in a conventional known manner. Also, the sheets may be actually formed on in-situ basis, that is, they can actually be formed on the rigid panel, per se. In this latter embodiment, strands of fiber containing reinforcing material are wound about the panels and thereafter, longitudinal strands may be applied to the initially wound strands. Since the strands are resin impregnated, they become bonded to one another to form a type of woven sheet and also become bonded to the panels, per se.

The apparatus is provided with a surface coating material station in a preferred embodiment. The resin impregnated fiber reinforced plastic sheets, whether or not laminated to a rigid panel or to one another, may then be provided on one or both exterior surfaces with a surface coating material, as for example, a gel coating. Thus, the surface coating material permits the filling of any void in the various layers and enables the structure to have a relatively smooth surface finish. In a preferred aspect, a suitable gel coating is applied to each of the exterior surfaces of a laminable structure to be produced. This gel coating or other surface material also masks any inconsistencies in the layers containing the fiber reinforcing materials and also masks any imperfections, such as knots or discolorations in the rigid panel.

The gel coating or other surface finishing material is applied typically to the fiber containing reinforcing material while the resin matrix as is still in a tacky state, that is, before it is fully cured. In this way, the resin matrix, when it is cured, will become part of the rigid laminate structure and will also rigidly bond the surface material to the laminate structure.

The laminable members are thereafter introduced into an opening or gap formed between a pair of spaced apart moving and continuous belts. These belts serve as laminating belts which force the various laminable members into contact with each other and in one embodiment may function as conveyor belts. The pair of belts are preferably upper and lower belts and each of the belts may be trained about a pair of longitudinally spaced transversely extending rollers. The pairs of rollers are each respectively mounted on frames and each of the frames is provided with means for adjusting the tension on each of the belts. In addition, each of the frames is provided with means for adjusting the size of the opening formed between the opposed belts which receive the laminable members. In another embodiment the belts are located around housings and the air body is created between the housing and the belts so that the belts are effectively free-floating.

Each of the belts is continuous as aforesaid and has first surfaces or so-called "inner" surfaces and second surfaces or so-called "outer" surfaces. A housing forming a plenum chamber is located interiorly of each of the belts. Each of the opposed housings has relatively flat walls which face toward the laminable members. In addition, each of the housings and particularly the last mentioned wall is provided with a continuous seal, such as a rib or a lip, extending toward the second or interiorly presented surfaces of each of the continuous belts. Moreover, each of the housings is provided with a source of air or similar gas under pressure and the walls facing the belts have air passage apertures in order to create a pressure body on the interior surfaces of the belts. In this way, each of the spaced apart belts has portions thereof which are urged into generally uniform contact with the laminable members thereby causing the laminable members to be forced into intimate contact with each other. During the curing of the resin matrix, the bonding of the various laminable members will result.

The air which passes through the aforesaid apertures in the wall of the housing facing the interior surface of the belt may escapes between the continuous seal and the belt and thereby form an air bearing surface. In this way, the interior surfaces of the belts do not come into contact with the wall of the housing but are urged into contact with the laminable members by the air bearing created there between.

The air which is used to create the air body may be heated and/or the housings may be provided with heaters. In addition, the belts may be heated in order to provide heat to the laminable members. In this way, the heat applied to the laminable members will cause the resin matrix to proceed to a final cure, thereby providing an effective augmented curing system. The amount of heat applied will be dependent upon the type of resin matrix used and also upon the amount of heat which is required to cause the resin matrix to proceed to a final cure.

The reinforced plastic flat sheet structures which do not employ a rigid panel as a part thereof are produced in the same manner as the previously described flat sheet laminate structure. The flat sheet structure may be formed by a single layer of reinforced plastic fiber-containing sheet which is impregnated with a curable resin matrix and which is cured. The apparatus of the present invention is highly effective in producing such a structure inasmuch as it is capable of providing a consistent amount of pressure to the sheet substantially across the entire surface of the sheet in a high speed continuous operation. In like manner, the flat sheet structures may be formed by two or more layers of reinforced plastic fiber-containing materials which are impregnated with a curable resin matrix which is cured in the same manner as previously described.

When making laminate structures using rigid panels, such as plywood panels, the panels are preferably pushed so that they are tightly abutted against one another. Thereafter, the fiber containing reinforced plastic material is applied to the endwise abutted panels. In this way, when the reinforcing material has adhered to the panel, the continuous endwise abutted panels form one continous plank which can be cut to any desired size. The pushing of the panels through the belts enables the panels to maintain the endwise abutted relationship. However, when forming either a single sheet of reinforced plastic material or a laminate of reinforced plastic sheets, then it is desirable to pull these sheets through the belts. For this purpose, a puller mechanism may be provided. Finally, it is also possible to drive one or both of the belts, per se in order to move the component materials forming the laminable structure through the belts.

This invention possesses many other advantages and has other purposes which may be made more clearly apparent from a consideration of forms in which it may be embodied. These forms are shown in the drawings accompanying and forming part of the present specification. They will now be described in detail, for the purposes of illustrating the general principles of the invention; but it is to be understood that such detailed descriptions are not to be taken in a limiting sense.

BRIEF DESCRIPTION OF THE DRAWINGS

Figure 1:
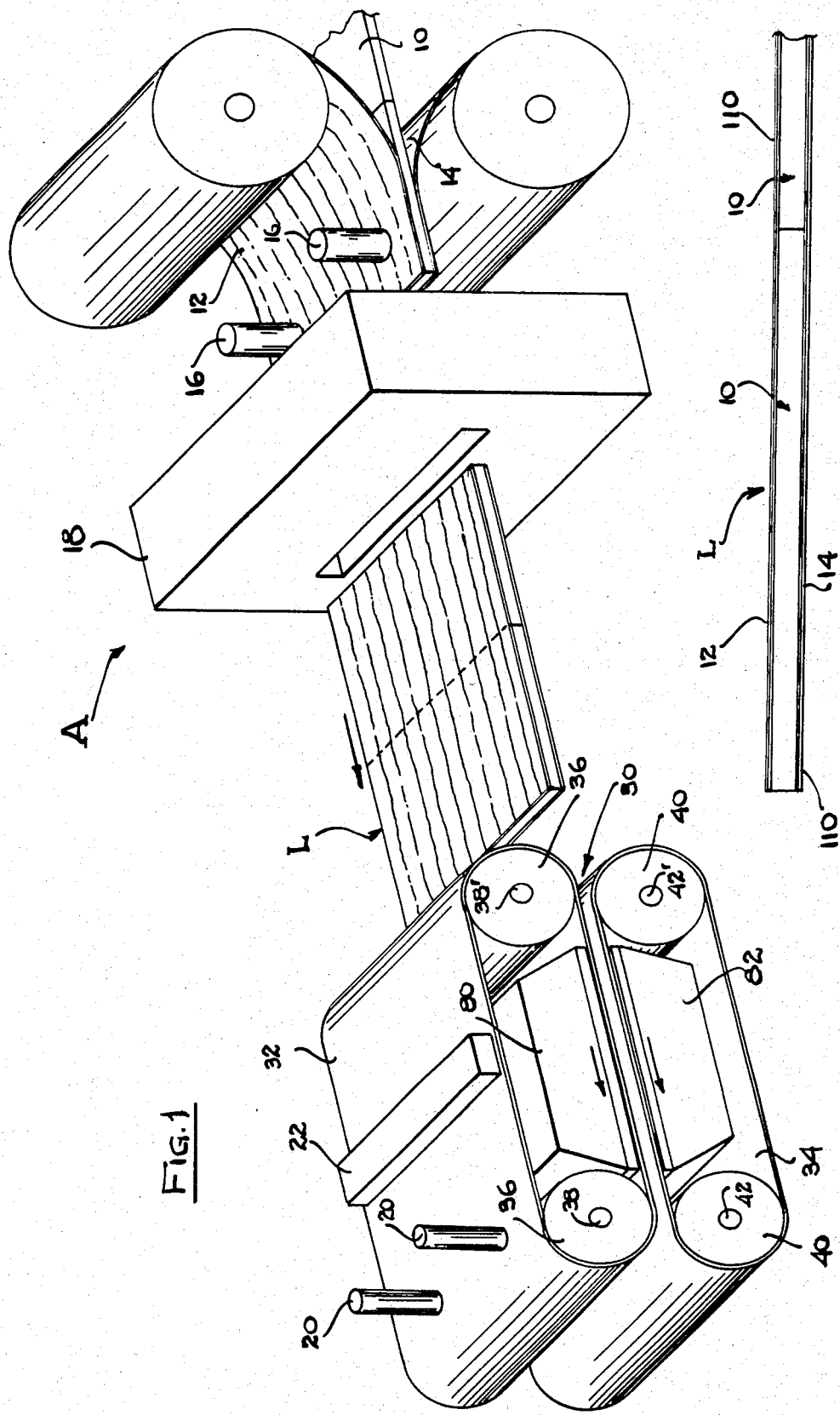
Figure 7:
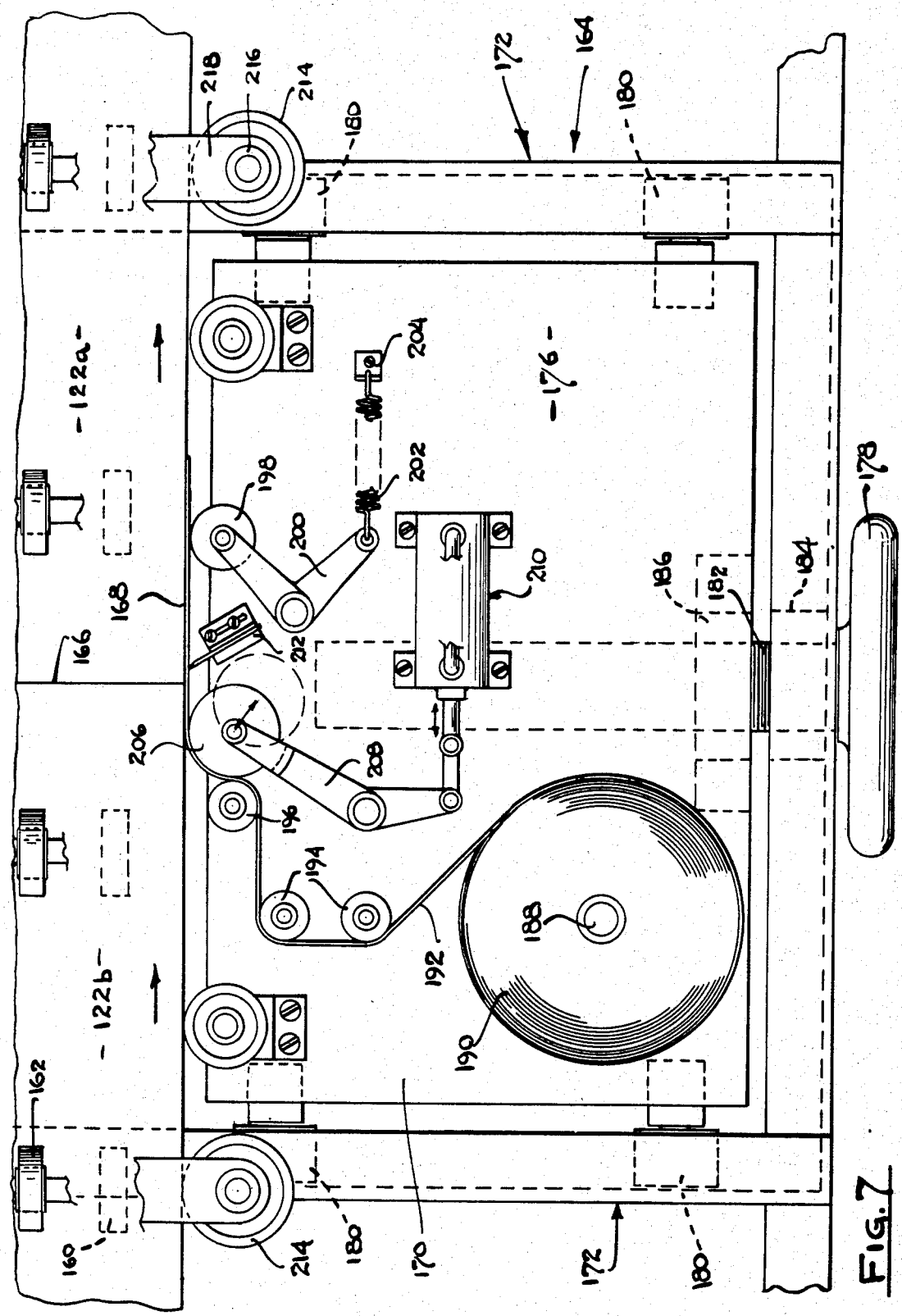
Figure 8:
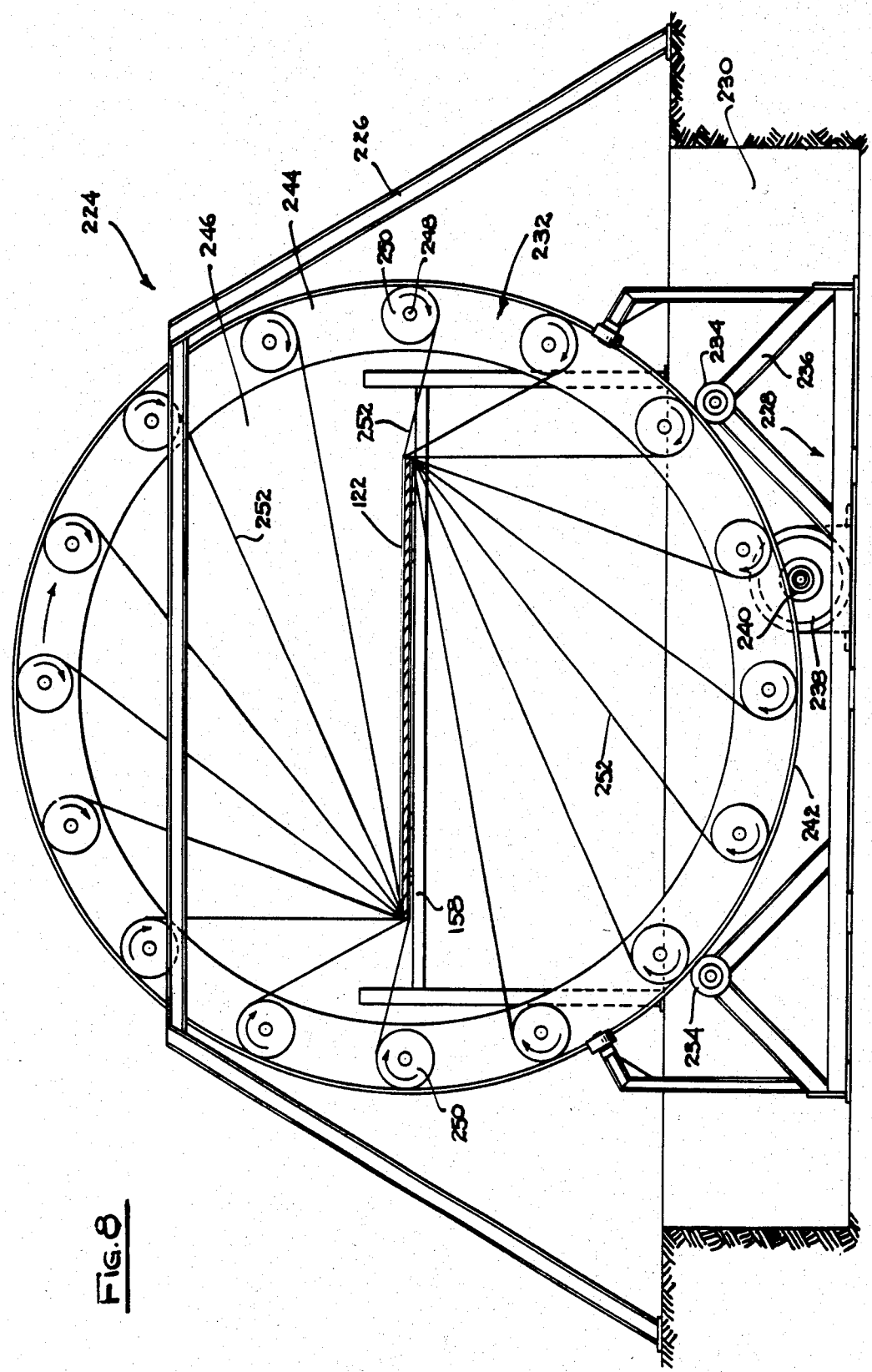

Having thus described the invention in general terms, reference will now be made to the accompanying drawings in which:

FIG. 1 is a schematic perspective view of an apparatus constructed in accordance with and embodying the present invention for forming the reinforced plastic flat sheet structures;

FIG. 2 is a side elevational view of a portion of the apparatus of FIG. 1;

FIG. 3 is a perspective view of one of the housings forming a plenum chamber used in the apparatus of FIG. 1;

FIG. 4 is a fragmentary vertical sectional view taken along line 4—4 of FIG. 3;

FIG. 5 is a fragmentary side elevational view of one of the flat sheet laminate structures formed in accordance with the present invention;

FIG. 6 is a composite of FIGS. 6A, 6B and 6C which together show a side elevational view of a modified form of an apparatus constructed in accordance with and embodying the present invention;

FIG. 7 is an enlarged horizontal sectional view taken along line 7—7 of FIG. 6A and showing a mechanism for applying an edge band to the laminated structure during the making of the same;

FIG. 8 is a vertical sectional view taken along line 8—8 of FIG. 6 and showing a mechanism for applying strands of reinforcing material to the sheets being created into a laminate structure in accordance with the present invention;

FIG. 9 is an enlarged fragmentary vertical sectional view showing one of the continuous seals used in the apparatus;

FIG. 10 is a schematic side elevational view showing one form of pre-curing mechanism which may be used in the present invention;

FIG. 11 is a fragmentary vertical sectional view, somewhat similar to FIG. 9, and showing a modified form of continuous seal, which may be used in the apparatus; and FIG. 12 is an enlarged vertical sectional view, showing one form of laminate structure, which may be produced in accordance with the present invention.

DETAILED DESCRIPTION OF PRACTICAL EMBODIMENTS

Referring now in more detail and by reference characters to the drawings which illustrate practical embodiments of the present invention, A designates an apparatus for producing a reinforced plastic flat sheet structure and which is more fully illustrated in schematic form in FIG. 1 of the drawings. In this case, a laminate structure L is formed of one or more endwise abutted rigid panels 10 having upper and lower flat surfaces and which constitute one of the laminable members forming part of the laminate structure L. As illustrated, two such rigid panels 10 are disposed in an endwise abutted relationship, although in a commercial embodiment of the apparatus, a large number of endwise abutted panels would be provided in order to produce a laminate structure L.

The panels 10 may be formed of any of a large number of materials including plastic sheets which may have been extruded or otherwise formed of plastic material by known plastic sheet producing processes. The panels 10 may also be formed of wood sheets, metallic sheets, or the like. In one of the more preferred aspects, wood sheets, such as plywood sheets, or otherwise relatively low-grade wood, are preferred inasmuch as the laminate structures L form a highly durable, relatively rigid, solid structure which can be prepared with a high degree of aesthetic appearance.

In making the laminate structures so-called "sandwich" structures, it is possible to laminate reinforced plastic sheet materials to a rigid panel, or to laminate one or more reinforced plastic sheets to one another in order to form a rigid panel. Further, it is possible to cure the resin matrix impregnated into a sheet of fiber reinforcing material to form a single ply rigid panel. When using a rigid panel as the interior member of a reinforced plastic sheet structure, it is possible to also use any low-density core material, as for example, a urethane core, a paper honeycomb structure, or the like.

A second laminable member 12 in the form of a fiber-containing reinforced plastic sheet is facewise disposed on the upper surface of the endwise abutted panels 10 and a similar laminable member 14 formed of a similar fiber-containing reinforced plastic sheet is facewise disposed on the lower flat face of the endwise abutted rigid panels 10. In this case, the sheets 12 and 14 could be manually laid upon the flat surfaces of the endwise abutted panels 10, or otherwise could be brought into contact therewith from suitable sources of supply by using lay-down rollers and the like. Thus, for example, the fiber-containing sheets 12 and 14 may include strands of fiber reinforcing materials which have been resin impregnated and brought into contact with the flat surfaces of the panels 10 by means of lay-down rollers or lay-down shoes.

It should be observed that the laminable members 12 and 14 are referred to as "sheets", although they could include any form of reinforcing material, as for example, strands, tapes or the like, which are merely brought into facewise contact with the flat surfaces of the rigid panels 10. Consequently, the members 12 and 14 are referred to as "sheets", even though they could merely adopt the form of sequential strands of weaving or tape which are resin impregnated and brought into flat contact with the flat surfaces of the rigid panels 10. Hence, the sheets 12 and 14 may also be referred to as "mats", although either term will refer to such materials as being either woven or non-woven, but having at least resin impregnated fiber containing strand material.

Any type of fiber reinforced mat material may be employed in the present invention, though the most preferred mat material employed is that made of glass, e.g. fiberglass mat. In this respect, it should be understood that while the embodiments of the present invention are described utilizing fiberglass mat or fabric, the use of fiberglass is only exemplary and other fiber-containing materials (hereinafter described) can be used. Therefore, it should be recognized that fiber reinforced mat material formed of carbon, quartz, graphite, asbestos, aluminum, etc., can be effectively used. Mats formed of lithium and grown whisker materials can also be employed. In addition, it is possible to employ fiber reinforced mats with metal wire interspersed between the fiber material in the mat, in the event that it is desired to add some type of metallic body to the mat material and to the ultimate laminate, for purposes such as achieving electrical conductivity. The term "mat" which refers to the fiber containing fabric is often used interchangeably herein with the term "web" and each refers to a fabric which contains fiber reinforcing material.

The fiber containing reinforcing sheets are impregnated with a suitable binder, such as a resin matrix, at a resin impregnating station, which may include resin impregnators 16, in the manner as illustrated in FIG. 1. These impregnators may adopt any convenient means of applying the resin matrix or the binder to the fiber containing sheets. Thus, in the illustrated embodiment, the resin applicators 16 adopt the form of simple standpipes which meter the resin matrix to the sheet as it passes therebeneath. It should be understood that similar applicators (not shown) could be located beneath the lower sheet 14 for forcibly pumping the resin matrix through the sheet.

The resin matrix may be applied to the reinforced plastic sheets 12 and 14 prior to contact with the panels 10, or otherwise the resin matrix may be impregnated in the sheets after they have been placed in contact with the panels 10.

Any material which is capable at some stage of the process of being liquified and softened for a period of time may be employed as the resin binder or so-called "resin matrix". The matrix should be sufficient to flow into and fill the interstices between adjacent filaments and layers thereof before achieving a rigid state through cooling or completing polymerization to become a rigid solid. Furthermore, the matrix should possess the ability to adhere to the reinforcement. Some examples of the suitable binders or matrix which can be employed in the present invention are various thermoplastic resins, such as nylon, polyethylene, polypropylene, many of the polycarbonates, etc. In addition, thermosetting resins such as many of the polyesters, phenolics and epoxies, etc. can be used. Generally, the thermosetting resins should be capable of being fused into an insoluble, non-heat softening mass upon application of heat or similar method of triggering the catalytic system. Other binders or matrixes are hard waxes, eutectic ceramics, eutectic metals, synthetic rubbers, etc.

In order to obtain adequate impregnation of the woven fiber mat or fabric, it may be desirable to forcibly "pump" liquid resin into the web, thereby forcing thus-displaced air outwardly from the web. This system is best accomplished by passing the wet-web between kneading rolls which alternately squeeze and relax the laminate, much in the same manner as squeezing an immersed sponge several times to displace its air with a liquid.

Thereafter, the laminable layers are passed into a dielectric resin preheater or so-called "precurer" 18 in the manner as illustrated in FIG. 1. The dielectric preheater 18 generally comprises a pair of spaced apart electrodes which are connected to a suitable R.F. generator (not shown). The electrodes are essentially flat metal plates with a gap therebetween to accommodate the fiber-mat. The energy requirements for the dielectric precuring unit 18 have been calculated as being approximately 60 kilowatts at 27 megahertz. This type of energy level will deliver sufficent voltage to accommodate a two inch air gap as well as feed the impregnated facings. Furthermore, the R.F. generator would be air-cooled internally and provided with fans or blowers to pull the air into the generator cabinet through standard dust filters.

The R.F. generator, as well as the various other mechanisms on the apparatus A, would be operated from a master control panel (also not shown), through which all control commands and settings originate. The actual control system which is used to operate the various components in the apparatus A in pre-timed arrangement would be essentially conventional in its construction and is also dependent upon the various operating parameters desired in the apparatus. Accordingly, the control system as such is neither defined nor illustrated in any detail herein.

The R.F. curing units of the present invention may also operate at a frequency range of 13 to 100 megahertz. Furthermore, microwave curing units may also be employed and would operate with the range of 900 to 25,000 megahertz. Accordingly, the term "dielectric" as used herein will refer to both R.F. curing in the range 13 to 100 megahertz and microwave curing from 900 to 25,000 megahertz. While the theory of microwave and radio frequency curing is not completely understood, it is believed that the curing in most resin-fiber systems, in part, occurs by molecular friction. The molecules of the resin have a polar structure, such that when an electrical field is introduced across the molecules of the resin, the molecules will tend to orient in the direction of the field. After release of the field the molecules will attempt to reorient back to their original direction. This is believed to create a frictional effect between the molecules and thereby produce heat in the resin matrix.

The ability of the resin matrix to accept the electrical energy is dependent upon the electrical loss tangent of the resin system. Accordingly, the thermosetting resins are selected with the proper electrical loss tangent for use in the dielectric curing system of the present invention. All of the thermosetting resins described hereinabove have the proper electrical loss tangents for use in this system. The resins generally have a high electrical loss tangent in the monomeric form and a low electrical loss tangent in the polymeric form. In this manner, the curing process is self-limiting so that the resin matrix may not be over-cured. In addition, the amount of energy directed to the electrodes in the preheater 18 is carefully controlled so that the resin is not actually cured. The resin may be advanced to a B or partially cured stage but is not advanced to the "C" or finally cured stage.

Thereafter, the laminable members are introduced into an elongated opening 30 formed between an upper continuous belt 32 and a lower continuous belt 34. In this case, the upper continuous belt 32 is spaced apart from the lower continuous belt 34 in order to form the opening 30 which is of sufficient dimension to accomodate the panels 10 with the reinforcing layers 12 and 14 disposed thereon.

The upper continuous belt 32 travels in the direction of the arrow as illustrated in FIG. 1 and the lower continuous belt also travels in the direction of the arrow as illustrated in FIG. 1. Moreover, the upper belt 32 is trained about a pair of longitudinally spaced apart transversely extending rollers 36 which are mounted upon transversely extending longitudinally spaced apart shafts 38 and 38'. In like manner, the lower continuous belt 34 is supported by longitudinally spaced apart transversely extending rollers 40 which are similarly mounted upon transversely extending spaced apart shafts 42 and 42'.

The belts 32 and 34 rotate in the direction of the movement of the laminable structure L and are trained about the respective drive rollers 36 and 40 so as to maintain the same rate of speed of movement as the laminable members. In this respect, one or more of the shafts 38 and 38' or 42 and 42' may be powered for rotation.

In the embodiment, as illustrated, the belts 32 and 34 are driven by means of powering one or both of the rollers 36 for rotation and/or by powering one or both of the rollers 40 for rotation. In like manner, it is possible to provide a gripper mechanism or pinch rollers for pushing the panels and sheets applied thereto through the apparatus. Otherwise, puller mechanisms could be provided at a downstream location with respect to the belts for pulling the various laminable members through the various work stations in the apparatus. Further, as a combination thereof, it is possible to drive one or both of the sets of rollers 36 and 40 merely to facilitate startup, and thereafter pull the various laminable components through the apparatus by gripper mechanisms.

The belts 32 and 34 are preferably made from stainless or mild steel. The belts could also be made of glass fiber-reinforced Teflon and similar materials. However, the belts could be made of any suitable material which does not adhere to the laminable members as they pass therethrough. Moreover, the belts should be sufficiently flexible so as to generally assume the configuration as illustrated in FIG. 1 of the drawings.

Associated with the upper belt 32 is a gel coating station, which includes a pair of gel coat applicators 20, in the illustrated embodiment. These gel coat applicators 20 are typically feed nozzles, which are capable of applying, in a spray or simillar form, a coating of a gel resin to the outer surface of the belt 32 as it is moved. In like manner, a similar gel coating station would be located with respect to the lower belt 34 for also applying a gel coating resin to the belt 34.

A gel coating heater 22 is also associated with the upper belt 32, in the manner as illustrated in FIG. 1, for heating the gel after it has been applied to the belt 32. The heater 22 is designed to heat the gel to a point where it is almost fully curred, but which is still tacky at the time it comes into contact with thh uppermost surface of the reinforced plastic sheet on the laminated structure L. As this occurs, the liquid gel will adhere to the reinforced plastic sheet and become bonded thereto as the resin becomes fully cured during passage between the belts. The same holds true of a gel coat of resin applied to the lower belt 34. For this purpose, a similar heater 22 would be located with respect to the lower belt 34 for heating the liquid gel applied to the belt 34. In this way, a surface protective coating is applied to both of the upper and lower surfaces of the laminate structure as it is produced.

The gel coating actually forms a solid coating on the upper and lower surfaces of the laminable members and fills in any voids or holes which might otherwise exist. Further, this surface coating tends to cover any imperfections in any of the laminable members. It is important to apply the gel coating to the resin immediatesly before it has become fully cured, that is, while the liquid resin is still tacky. Furthr, it is desirable to have the liquid gel almost completelyu cured or polymerize when brought into contact with the surfaces of hte laminable members and hte partially-cured resin. Thus, the heaters 22 are controlled so as to apply the proper amount of heat or other curring radiation to the liquid gel in order to meed these conditions.

It should be understood that other forms of protective surface coatings could be employed in place of the liquid gel. For example, it is possible to apply certain films, such as fluorocarbon films, e.g., the "Tedlar" film offered by the E. I. Dupone de Nemours Company as a protective surface film. There are also various urethane filmes which could be used inplace of the gel and also disposed in contact with the resin impregnated plastic sheets, immediately prior to the curing of the resin.

Referring now to FIG. 2 the upper and lower shafts 38' and 42' are both journaled to pairs of being blocks 44 and 46 which are, in turn, mounted on upper and lower frames 48 and 50, respectively. The lower frame 50 may be secured to a floor or similar supporting surface 52 and the upper frame 48 may be vertically shiftable with respect to the lower frame 50 in order to adjust the size of the opening or gap 30 formed between the belts 32 and 34, in a manner to be hereinafter described in more detail.

The shafts 38 and 42 are also mounted with bearing blocks 54 and 56 which are longitudinally shiftable with respect to the upper and lower frames 48 and 50 within elongated slots 58 and 60, respectively, formed within the upper and lower frames 48 and 50. The positions of the bearing blocks 54 and 56 and hence, the drive shafts 38 and 42 will affect the amount of tension on the belts 32 and 34. Moreover, each of the bearing blocks 54 and 56 are provided with outwardly extending bolts 62 and 64 which are also provided with threaded adjustment fittings 66 and 68, respectively, in the manner as illustrated in FIG. 2 of the drawings. In this way, by merely turning the bolts 62 and 64, it is possible to adjust the amount of tension on each of the repective belts 32 and 34.

Mounted on the lower frame 50 adjacent each of the longitudinal side portions near the transverse ends thereof are a pair of spaced apart gap adjusting mechanisms 70 and 74 and, each having an upper bracket 72. Similarly mounted on the upper portion of the lower frame 50 on the longitudinal side portions near the transverse ends thereof, are pairs of spaced apart brackets 76 similar to the brackets 72. The gap adjusting mechanisms 70 and 74 include adjustment bolts 78 which engage the lower brackets 76. By merely adjusting the position of the bolts 78, it is possible to provide for a desired gap spacing between the two belts 32 and 34.

Facing the interior surface of the lower portion of the upper belt 32, in the manner as illustrated in FIG. 1, is a first housing 80 forming a plenum chamber for receiving air under pressure. In like manner, a second housing 82 faces the interiorly presented surface of the lower belt 34, also in the manner as illustrated in FIGS. 1 and 2, and which also forms another plenum chamber.

Each of the frames 48 and 50 may be provided with heater mechanisms 84 and 86, in addition to the quartz heaters 27 used for heating the gel. These additional heaters 84 and 86 would be provided to heat the belts 32 and 34 as they rotate. In this way, the heated belts will provide heat to laminable members and thereby facilitate the cure of the resin matrix. The heaters 84 and 86 may adopt any conventional form, as for example, electrical heaters or the like. Cartridge heaters, hereinafter described in more detail could also be provided. The heat or radiation which is applied must be sufficient to at least energize the resin matrix in order to facilitate the exothermic reaction thereof.

The lowermost housing 82 is more fully illustrated in FIGS. 3 and 4 of the drawings. The upper housing 80 is substantially identical thereto and is therefore neither illustrated nor described in any further detail herein. The lower housing 82 is generally comprised of an enclosing side wall 88 which is tapered downwardly and inwardly in the manner as illustrated in FIG. 2 and forms an internal plenum chamber 90. At its lower end, the enclosing side wall 88 is provided with a bottom wall 92 and connected to the bottom wall is a pipe or similar conduit 94 for supplying air or similar gas under pressure to the plenum chamber 90.

On its upper end, the side wall 88 is provided with an enclosing top wall 96 which is relatively thick in the vertical dimension. The top wall 96 includes a flat upper surface 98 which is provided with a plurality of apertures 100 permitting air in the chamber 90 to pass therethrough. Mounted on the flat upper surface 98 of the top wall 96 is a continuous sealing ring 102 which projects upwardly therefrom toward the belt 34. In this case, the sealing ring 102 may be formed of any suitable material, as for example, various known rubber or plastic materials. In like manner, the sealing ring 102 could adopt the form of a steel or other metal ring.

As the air passes through the apertures 100, it creates a pressurized body of air typically referred to as an "air body" or "body of air" 104 bounded by the upper surface of the top wall 96, the belt 34 and the sealing ring 102. A similar air body is created with respect to the other housing and belt. Further, an air bearing 106 may be created between the upper edge of the sealing ring 102 and the lower surface of the portion of the belt 34 facing the sealing ring 102. This air bearing surface is sufficient to maintain the belt 34 in sealing relationship with respect to surface 98 of the plate 96. Moreover, the amount of air or similar gas which is introduced into the chamber 90 is sufficient so that it will force the belt 34 into intimate contact with the outermost of the laminable members. In this way, the various laminable members will be forced into intimate contact with each other and with substantially uniform pressure to provide a continuous facewise contact during the actual curing process.

It should be understood that the upper belt 32 will be similarly forced into contact with the upper surface of the laminable members passing therebeneath by means of a similar air bearing created on the lower portion of the housing 80. Again, the structure of the housing 80 is similar to that of the housing 82, and it also cooperates to create an air body and air bearing in like manner.

It is not necessary to use a high degree of pressure in order to urge the belt into contact with the surface of the laminable sheets. For that matter, it has been found that air pressures as low as three pounds per square inch could be used. However, in the more preferred aspect of the invention, six pounds per square inch to about ten pounds per square inch have been found to be quite effective. In this regard, and in the preferred aspect, the various belts 32 and 34 are preferably formed of stainless steel. Moreover, the sealing ring 102 may be somewhat rectangular in shape, although in many cases, it has been found to be desirable to provide an O-ring seal.

It is also possible to provide heaters 108 which extend through the top plate 96. The heaters 108 may again adopt any conventional form, as for example, cartridge heaters, which are capable of heating the top plate 96, and hence the air passing through the apertures 100. Moreover, the heaters 108 could be sufficient to actually provide additional heat inductively to the various belts 32 and 34. The heaters 108 would be connected to a suitable source of electrical current by means of electrodes (not shown).

One of the laminable structures thus produced in accordance with the present invention is more fully illustrated in FIG. 5 of the drawings. In this case, the laminable structure includes a pair of endwise abutted panels 10 and which are provided with the first and second fiber-containing layers 12 and 14 and with the gel coats 110 on the exterior surfaces thereof.

The apparatus A of the present invention has been described in connection with the production of a laminate structure L which is a rigid panel. However, it should be understood that the apparatus A would be used in the same manner to produce flat sheet structures which used one or more layers of fiber containing material.

The apparatus which is capable of carrying out the method of the present invention may be provided with edge trim saws for trimming the longitudinal edges of the laminable structure L as they pass through the apparatus. The edge trim saws may be set to finish as well as size the edge of the laminated structures. In addition to the above, a traveling cut-off saw may also be provided to cut the laminate structures transversely in order to provide structure sections of a desired size. Various tripping switches (not shown) would be operable to actuate the various saws for this purpose.

The apparatus should be designed to operate at a high rate of speed in producing the laminate structures. As indicated previously, the curing ovens 18 may function as preheaters in order to initially start the exothermic reaction of the resin matrix and advance this resin matrix at least to the "B" stage during processing through the apparatus. Moreover, this would substantially eliminate all of the moisture which might be contained in the fiber sheets. Thereafter, a final curing oven may be employed if desired, depending upon the type of resin matrix which is employed.

FIGS. 6–10 more fully illustrate another embodiment of an apparatus B of the present invention. This embodiment of the apparatus B as illustrated in FIGS. 6–10, is more fully adapted for high speed mass production of reinforced plastic sheet structures.

The apparatus B generally comprises a rigid panel feeding mechanism 120 which feeds rigid panels 122 and which rigid panels may constitute the second laminable and typically second rigid laminable member. The panel feeding mechanism 120, generally comprises an outer frame 124 having a plate 126 biased upwardly in the direction of the arrow in FIG. 6A so that an uppermost panel on the stack of panels is located in alignment with a receiving table 128. A separate means (not shown) would be provided for incrementally pushing the uppermost of the panels onto the receiving table 128 so that one panel is located in endwise abutment with the next panel previously moved onto the table 128 and with each succeeding panel located in endwise abutment.

The receiving table 128 may function as a conveyor table and for this purpose, is provided with a plurality of longitudinally spaced apart transversely extending rows of rollers. The table 128 is further provided with pairs of end rollers 130 and 132 which are driven by a suitable hydraulic or electric motor, as for example, a motor 134. Further, a centering device 136 may be provided for centering the panels on the conveyor table 128. In this respect, the centering device would have an adjustable width that is, it would be adjustable in the transverse dimension, so as to accommodate panels of differing widths.

Locating immediately beneath the receiving table 128 is a large hydraulic drive unit 138 and which is provided with a control panel 140. In this case, many of the components in the apparatus B may be driven by this hydraulic drive unit 138 in a coordinated time related manner. Thus, these components would be connected to the hydraulic drive unit 138 by hydraulic lines (not shown).

The apparatus B may be provided with a main control panel 142, as more fully illustrated in FIG. 6A, and which includes all of the necessary controls (not shown) and the various readout gauges (also not shown) for operation of the apparatus B safety control switches and the like would also be provided on this panel 142.

Located immediately to the right of the receiving table 128 is a panel drive unit 144. This panel drive unit 144 generally comprises a main frame 146 carrying an upper hold-down roller 148 and a lower supporting roller 150. The upper roller 148 is biased downwardly into engagement with the upper surface of the panel 122 by means of a hydraulic drive cylinder 152. Further, either the upper roller 148 or the lower roller 150 or both may be driven by means of a suitable hydraulic motor or an electric motor or other motive means (not shown). The frame 146 also carries a control panel 154 for purposes of operating the drive unit 144. The pair of rollers 148 and 150 operate in combination to tightly engage each of the panels as they pass therebetween and are rotated such that the panels are driven to the right, reference being made to FIG. 6A of the drawings. In this way, the drive unit 144 serves as the main drive unit for moving each of the panels through the apparatus B. However, it should be understood that other auxiliary drive apparatus could be provided as may be necessary or desired.

The main drive unit 144 moves the panels in between upper and lower conveyor members 156 and 158, respectively. The lower member 158 is provided with supporting rollers 160 more fully illustrated in the dotted lines of FIG. 7 for receiving and permitting movement of the various panels 122. The upper member 156 is provided with hold-down rollers 162 which engage the upper surfaces of the panels 122 for guiding the same. In this way, the cooperating sets of rollers 160 and 162 prevent any vertical displacement of the various panels during movement through the apparatus B. The various rollers 160 and 162 are more fully illustrated in FIG. 7 of the drawings.

The panels 122 are then moved into an edge banding device 164 which is more fully illustrated in FIGS. 6A and 7 of the drawings. This edge banding device is designed to apply tape or so-called "banding" to the opposite vertical edges of endwise abutted panels and in the region of the endwise abutments.

By reference to FIG. 7 of the drawings it can be observed that a first panel 122a and a second panel 122b have transverse edges abutted together at a line of abutment, and which line of abutment is designated by reference numeral 166. For this purpose, it is desirable to apply edge banding or tape 168 at least in the region of the abutting edges 166. It can also be observed that the edge banding or tape 168 extends only for a short distance along each of the opposite longitudinal edges of each of the endwise abutted panels 122a and 122b. The edge banding is highly effective to prevent any cross wound rovings, that is rovings which are wound in a circumferential path or helical path, from forcing their way into the region between the two endwise abutted panels 122a and 122b. For this purpose, the banding itself may be formed of fiber reinforcing material, as for example, adhesively coated glass fiber tapes, or the like. However, any form of tape suitable for this purpose, may be provided.

The edge banding device 164 generally is formed as a carriage which comprises a main frame or base plate 176 and mounted adjacent thereto are, carriage 170 forming supporting frames 172 with one on each of the opposite sides of the main base 170. The carriage supporting frames 172 are stationary and support shiftable carriages 170 for adjustment to accomodate various panel widths.

One of these carriages 170 is more fully illustrated in FIG. 7 of the drawings. Mounted on the main frame 170 is a manually engageable hand wheel 178 and which is rotatable in order to shift the carriage 170 inwardly and outwardly with respect to the longitudinal edges of the panel. Thus, for purposes of receiving wider panels, the hand wheel 178 is rotated so that the carriage 170 is shifted outwardly, that is, away from the panels 122 passing through the apparatus. In like manner, and for more narrow width panels, the hand wheel 178 is rotated so that the carriage 170 is shifted inwardly. It should be understood that the carriage 170 on the opposite side of the panels would also be operated in like manner. Furthermore, each of the carriages 170 could be constructed so as to be operated from a single handwheel 178.

The horizontally disposed plate 176 of the carriage 170 is provided with outwardly extending rollers 180 on its undersurface and which are movable on the carriage supporting frame 172. In this way, the plate 178 is capable of being moved inwardly and outwardly. By further reference to FIG. 7, it can be observed that the manually engageable hand wheel 176 is provided with a jack shaft 182 which is journaled in a sleeve 184 and engages an internally threaded aligned sleeve 186 mounted on the plate 170 and in this way causes the shiftable movement of the plate 170.

Mounted on the upper surface of the plate 170 is an upstanding spool shaft 188 for removably receiving spools 190 of the edge banding or tape. By further reference to FIG. 7, it can be observed that a tape 168 removed from the spool 190 is trained around guide rollers 194 and 196 and applied to the edge of the two endwise abutted panels 122a and 122b. A first roller 198 mounted on a bellcrank arms 200 is biased into contact with the tape 168 forcing the same into tight and adhesive contact with the vertical edges of the two endwise abutted panels. A spring 202 is connected to one of the arms of the bellcrank 200 and to a bracket 204 in such manner that it serves to bias the roller 198 into contact with the tape 168 to apply same to the edges of the panels.

The edge banding device 164 is also provided with a second roller 206 which is also designed to initially force the tape 192 into intimate contact with the vertical edges of the endwise abutted panels. The roller 206 is mounted at one end of one of the lever arms of a bellcrank 208 in the manner as illustrated in FIG. 7 of the drawings. The other end of the bellcrank 208 is connected to pneumatic cylinder piston mechanism 210 and which is mounted on the upper surface of the plate 170. The lever arms the bellcrank 208 operate as a typical bellcrank arrangement and will be biased to the position as shown in FIG. 7 when the mechanism 210 is so actuated. The mechanism 210 would be connected to the control system of the apparatus to be actuated in a proper timed relationship to the length of the panels. The pneumatic cylinder piston mechanism 210 operates in conjunction with a fixed knife 212. It can be observed that the edge banding is only applied to the longitudinal vertical edges of the two panels in the region of the abutment. The knife 212 is located so that the tape 192 is drawn against the knife 212 to sever the tape when the rollwer 206 is retracted (clockwise). Thus, the biasing action of the roller is coordinated to the whole length of the panels. The tape is thus applied only in the region of the abutment of the two endwise abutted panels.

By further reference to FIG. 7, it can be observed that the conveyor member 156 is provided with edge guide rollers 214 journaled on pins 216 and mounted on arms 218 on each of the opposite sides thereof. The guide rollers are capable of being shifted inwardly and outwardly relative to the panels also, in order to accomodate varying width panels. Thus, the support rollers 160 and the hold-down rollers 162 will maintain the panels within vertical alignment in the apparatus and the various guide rollers 214 on opposite sides thereof will maintain horizontal alignment of the various panels as they pass through the apparatus B.

The panels 122 are next passed through a winding apparatus 224 which constitutes a first material application stage. The winding apparatus 224 is designed to apply circumferential or helical windings of roving material or other forms of fiber reinforcing material to the various panels 122.

The winding apparatus 224 is more fully illustrated in FIGS. 6A and 8 of the drawings and comprises a main outer frame 226 and a lower supporting frame 228. In the embodiment as illustrated, the lower supporting frame 228 is located within a recessed area 230 formed in the ground or other supporting surface in order to reduce the overall height requirments. The lower supporting frame 228 rotatably supports a winding wheel 232 on support rollers 234 and the latter of which are rotably mounted on triangularly shaped struts 236.

The winding wheel 232 is rotated by means of a suitable electric motor 238 which drives a drive pinion 240 and the latter of which is disposed in meshing engagement with a gear track 242 on the outer periphery of the winding wheel 232. However, it should be understood that any form of supporting the winding wheel 232 may be employed and furthermore, any means for driving the winding wheel 232 could also be employed. Thus, for example, a suitable motor, e.g. an electric motor, along with a drive chain connected to some portion of the winding wheel could be employed.

By further reference to FIG. 8 of the drawings, it can be observed that the winding wheel 232 is actually formed by a large cylindrically shaped ring 244 thereby forming an enlarged central opening 246. Moreover, the winding wheel 232 is sufficiently large so that the panels 122 can pass through the winding wheel 232 in the enlarged opening 246.

Mounted on the opposite flat surfaces of the winding wheel 232 are spool shafts 248 which removably support spools of roving 250. The strands of the roving 252 are unwound from each of the spools 250 and thereupon wound about the panels 122 as the panels 122 pass through the winding wheel 232, in the manner as more fully illustrated in FIG. 8 of the drawings. The various strands of roving 252 would normally be threaded through eyelets or so-called "redirects" to final placement eyes or similar means located close to the panels for properly positioning the strands of roving material on the panels 122 as they pass through the enlarged opening 246.

It can be observed that inasmuch as spools are located on each of the opposite sides of the winding wheel 232, the strands of roving may be applied in crosswound patterns. Furthermore, the angle of the strand wrap will be dependent upon the speed of rotation of the winding wheel and the speed of movement of the panels 122 through the enlarged opening 246. If the panels 122 were stationary, a true circular winding would be applied. However, due to the fact that the panels 122 are moving, somewhat of a helical wrap will be formed around the panels as they pass through this winding station.

It should be understood in connection with the present invention, that it is possible to provide a large number of winding stations which have winding apparatus similar to the winding apparatus 224. In this case, the speed of rotation of other winding wheels similar to the winding wheel 232 could be increased so that the strand wrap more closely approaches a circular wrap as opposed to a helical wrap. Thus, it is possible to provide wraps of varying degrees and also in various layers to the panels 122.

The wrapped panels are then passed into a second material application stage 254 which is more fully illustrated in FIG. 6B of the drawings. The material application stage 254 is designed to apply longitudinal or otherwise generally longitudinal strands of roving to the wound or wrapped panels 122, in a manner to be hereinafter described in more detail. A first source of the strands of roving (not shown) which supplies strands 256 would be provided so that the strands 256 may be applied to the upper surface of the panels. In like manner, a second source of the strands of roving (not shown) would be provided for supplying strands 258 to be applied to the lower surface of the wrapped panels. These sources of roving are essentially conventional in their construction and are generally comprised of a rack containing the spools of roving and which are usually threaded through carding plates in order to maintain proper alignment of each of the various strands.

It should be understood in connection with the present invention, that it is possible to apply sheets of woven or nonwoven fiber containing reinforcing material to the upper and lower surfaces of the panels or otherwise to one of the upper or lower surfaces. For that matter, strands of roving can be applied to the upper surface and sheets of material could be applied to the lower surface and in like manner strands of roving could be applied to the lower surface with sheets of material applied to the upper surface.

Fiber reinforcing material, which in the illustrated embodiment is present in the form of strands of roving 256 and 258 are introduced into a resin impregnating stage 260 prior to application to the upper and lower surfaces of the panels at the application stage 254. The resin impregnating stage 260 generally comprises a first resin impregnator 262 for impregnating the upper strands 256 and a second resin impregnator 264 for impregnating the lower strands. As indicated previously, any form of suitable binder which is hardenable may be employed. However, in the more preferred aspect of the present invention, the binder is that of a curable resin which may be cured upon the application of a proper radiation thereto. Thus, the resin matrix may adopt any of those compositions previously described or other compositions which are suitable for use in applications of this type.

The resin impregnaters 262 and 264 are present in the form of dip tanks 266 and 268 respectively, which are designed to contain the liquid resin for application to the fiber containing reinforcing material. In this case, the strands of fiber containing reinforcing material are introduced into the tanks 266 and 268 and may be held therein by means of hold-down rollers (not shown) or the like. At the upper edges and as the strands of impregnated reinforcing material leave the tanks, suitable doctor blades or doctor rollers may be employed for removing the excess resin. Inasmuch as these doctoring rollers or blades are conventional, they are neither illustrated nor described in any detail herein.

It should be understood that other forms of resin impregnation could be employed in connection with the apparatus B. For example, any of the means for impregnating the resin into the fiber reinforcing material previously described in connection with the apparatus A could be used. In addition, impregnation could be caused by reverse roll coating, bay spraying, or the like.

The upper strands 256 which have been impregnated, are then passed over guide rollers 270 and under application rollers 272, in the manner as illustrated in FIG. 6B. The strands of impregnated reinforcing material are thereupon applied to the upper surface of the wrapped panels. In like manner, the strands 258 are immediately applied to the lower surface of the panels as they exit the impregnating tank 268.

By further reference to FIG. 6B, it can be observed that two sets of strands 256 are applied to the upper surface of the wrapped panels. This is effective in that the strands could have some angled direction, that is, they may adopt other than a truly longitudinal arrangement on the panels. Thus, for example, one set of the strands 256 could be applied at a slight angle to the left and the other set of the strands could be applied at a slight angle to the right. Any arrangement for applying the strands in the most efficient manner could be employed.

By using the strands of fiber containing reinforcing material and applying the strands first in a diagonal or somewhat circumferential path, and thereafter applying longitudinal strands, it is possible to approximate the application of a woven fiber material as for example the so-called "woven roving". The "woven roving" would be effective for use in laminate structures, but the cost is considerably greater than the use of the pure roving strands. However, by applying the strands in the manner as heretofore described, it is possible to even improve on the contribution of the woven roving at only a very small fraction of the total cost thereof. This structure increases the abuse resistance and the resistance to various chemicals. Further, inasmuch as the strands can be applied in closely spaced relationship, and there is essentially no free spaces there between, when the binder or resin is cured there is little or no porosity. As a result, there is no confined space for bacteria to generate and grow.

By cross-winding the rigid panels, that is, applying one or more layers of circumferential or helical strands, wich form as a so-called "wrap" and also one or more layers of longitudinally extending strands, significantly enhanced physical characteristics of the resultant structure are attained. For example, by using the wrap of circumferential and/or helical windings, it is possible to obtain substantially higher stiffness than when using pure woven roving alone. In addtion, inasmuch as the longitudinal stands are reltaively stainght and are not woven as such, a substantially higher tensile strength is obtained.

The various laminable members, including the rigid panels 122 along with the wrapped strands and the upper and lower longitudinally extending strands are then passed into a bonding stage or bonding station 274. The bonding station 274 actually adopts the form of a bonding apparatus which functions to bond the various laminable members together in order to form the laminated structure. However, as indicated above, a single sheet of binder impregnated fiber containing material could be passed into the bonding station 274 and in which case, the resin or other binder will be hardened while the sheet is maintained in a relatively flat condition as hereinafter described in more detail.

The bonding apparatus 274 generally comprises a main frame 276. Mounted on and carried by the frame 274 is an upper belt supporting structure or framework 278 for retaining an upper continuous belt 280, hereinafter described in more detail. The belt supporting framework 278 is comprised of an upper support section 282 and two arcuately shaped end sections 284. In like manner, a lower belt supporting lramework 286 is provided for supporting and retaining a lower continuous belt 288. The lower belt supporting framework also comprises a pair of arcuately shaped end sections 290.

The belt supporting framework 278 and the belt supporting framework 286 are both formed with pneumatic chambers to create an air body or air bearing between their outer surfaces and the belt 280 and 288. Thus, the arcuate end sections 284 are provided with apertures (not shown) on their outer surfaces and which face the interior surface of the belt 280. In like manner, the upper section 282 is provided on its upper surface with apertures to permit escapement of air and thereby create an air body or air bearing between the downwardly presented surface of the belt 280 and the upper surface of the frmework section 282.

In like manner, the lower arcuate end sections 290 of the lower framework 286 are provided with apertures on their outer surfaces for creating a similar air bearing or air body between the interior surface of the belt 288 and the arcuate end sections 290. In this way, the belts are permitted to be spaced apart from the supporting framework and thereby may easily rotate with respect to the framework in a relatively friction free manner. It should be understood that air under pressure may be delivered to the various sections 282, 284 and 290 and in which case these sections are hollow to form chambers to receive the air under pressure. Suitable air ducts, as for example, air ducts 292, 294 and 296 may be provided for this purpose.

In accordance with the present invention, the interiorly presented surfaces of the two belts 280 and 288 are considered to be the first surfaces and the outer surfaces of the belts are considered to be the second surfaces.

Located over the lower portion of the upper belt 280 in closely spaced relationship to the first surface thereof is a housing 300 which forms a plenum chamber 302 on the interior thereof. A portion of this housing structure is more fully illustrated in FIG. 9 of the drawings. The housing 200 is provided with a lower wall 304 and which wall 304 is provided with a plurality of apertures 306 spaced across the entire surface thereof or at least that porion which is disposed over the belt 280. The plenum chamber 302 is connected to a suitable source of air or other gas under pressure such that the air introduced in the plenum chamber 302 can pass through the apertures 306 and thereby form an air body between the first surface of the upper belt 280 and the lower wall 304. For this purpose, the upper housing 300 is also suitably connected to a sourc of air under pressure by means of pneumatic lines (not shown).

The lower belt 288 is also provided with a similar housing 308, as shown in FIG. 6B, and having a construction similar to the housing 300. In this case, the lower housing 308 is located so that it is immediately beneath the upper portion of the continuous belt 288, in the manner as illustrated in FIG. 6B of the drawings. In like manner, the housing 308 will be provided with an upper wall similar to the wall 304 having apertures therein in order to create the air body between the belt 288 and the housing 308.

By further reference to FIG. 9, it can be seen that the upper housing 300 is also provided with a continuous peripherally extending seal 310 on the periphery of the lower wall 304. The seal 310 may be in the form of a somewhat resilient strip secured at one edge to the lower surface of the wall 304 in the manner as illustrated. Further, the seal 310 is provided with an arcuate portion 312 configured so that the innermost end 314 is struck upwardly to bear against the under surface of the wall 304 and thereby form a seal chamber 316. Moreover, the lower wall 304 is also provided with one or more apertures 318 which lead into the seal chamber 316, thereby providing a source of air under pressure to the seal chamber 316. In addition, the seal itself may be provided with additional air apertures 320 communicating with an air body 322 (often referred to as an "air pocket") between the upper belt 280 and the lower wall 304. In this case, it can be observed that the air body 322 is essentially bounded by the lower wall 304, the upper surface of the belt 380 and the continuous seal 310.

This construction of the seal is highly effective in that the seal has an air pocket substantially under the same pressure as the air in the air pocket 322. Moreover, there is complete communication between the seal pocket and that of the air pocket which bears against the belt 280. The lower surface of the arcuate portion bears against the belt 280 in sliding contact. However, since there is only very little surface area of the seal 310 in contact with the belt 280, the movement is also relatively friction free. In addition, the seal is constructed so that air could possibly escape between the seal and the belt and in this case there would be an air bearing there between. It should be understood that the lower housing 308 could be provided with a similar seal.

The seals 310 could be formed of any somewhat resilient material. For that matter, a steel plate which is sufficiently thin to be resilient could be employed. In one of the more preferred aspects of the present invention, the seals could be formed of teflon coated fiberglass material.

Also mounted on the frame 276 adjacent the lower portion thereof is a housing 323, which includes an interior plenum chamber for receiving air under pressure. The housing 323 has an upper surface 324, having a plurality of apertures formed therein (not shown) which permit the escapement of air and thereby form an air body under the lower portion of the belt 288. In this way, the lower portion of the lower belt 288 is prevented from sagging during movement.

The lower housing 324 could also be provided with suitable heaters, as for example, cartridge heaters 325 for purposes of heating the lower belt 288. In this case, it may be desirable to apply heat to the belt 288 in order to prevent the belt from acting as a heat sink, and also to apply heat to the resin matrix impregnated in the fiber containing sheets in order to cure the same.

Also mounted on the frame 276 is an upper plate 326, which is provided with a plurality of transversely-spaced apart gel spray heads 328, in the manner as illustrated in FIG. 6B. These gel spray heads 328 are designed to apply a gel spray coating to the outer surface of the belt 280. Moreover, the spray head 328 could be provided and transversely movable so as to continuously scan across the transverse sections of the belt 280 as it is moving. It should also be understood that a similar plurality of gel spray heads 328 would be located with respect to lower belt 288 for applying a gel coating to that belt as well.

Also mounted on the plate 326 are a plurality of banks of quartz heaters 330, which are designed to apply heat to the gel resin on the upper surface of the belt 280. Again, these quartz heaters 330 will heat the gel resin without curing it before it reaches the resin impregnated fiber-containing sheet reinforcing material, but will cure the same sufficiently so that it is at least partially cured and tacky. At this point in time, the resin itself impregnated in the fiber-containing reinforcing material sheets will also be slightly tacky. Thus, when the gel is completely cured and the resin is completely cured, during passage between the belts 280 and 288, the gel will be hardened to provide a relatively hard smooth outer surface to the laminate structure, and it will also be rigidly bonded to the remaining components of the laminate structure. Again, it should also be understood that other forms of surface protective coating could be employed in the manner as described above.

The lower wall 304 may also be provided with a plurality of strip heaters 332, which are located in closely-spaced relationship to the belt 280. These strip heaters are also preferably electrically operable heaters and are designed to heat the belt 280 in order to enable the latter to apply the heat-curing radiation to the resin matrix impregnated in the fiber-containing reinforcing material sheets. In addition, and if desired, the upper plate 326 may also be provided with cartridge heaters 334 in the manner as illustrated in FIG. 6B in order to also apply additional heat to the belt 280. Again, the cartridge heaters 334 would be primarily effective to apply sufficient heat the upper belt 280 in order to prevent the latter from becoming too cold and thereby operating as a heat tank. It should again be understood that the strip heaters would be provided on lower housing 308 in closely-spaced relationship to the lower belt 288.

As the panels and the reinforcing material thereon are passed between the belts 280 and 288, they will also permit the belts 280 and 288 to rotate therewith. Thus, in the illustrated embodiment, the upper belt 280 will rotate in a counter-clockwise direction, reference being made to FIG. 6B and the lower belt will rotate in a clockwise direction, reference also being made to FIG. 6B. As this occurs, the air pockets between the housing 300 and 308 and the associated belts 280 and 288, respectively, will force the belts into intimate contact with the layers of reinforcing material and the panels. This is quite important in connection with the present invention in that the entire lower surface of the upper belt 280 and the entire upper surface of the lower belt 288 are forced into intimate contact with the outer surfaces of the laminable members. Thus, completely uniform pressure is applied to all portions of the laminable members. This enables highly effective lamination without the typical problem of voids and ultimate resultant delamination. Furthermore, since the belts themselves may be heated or otherwise since other forms of curing radiation may be applied, while the belts are forced into intimate contact with the laminable members, very effective curing is obtained.

It can be observed that the pressure which is applied to the belts is uniform across the entire surfaces of the belts in contact with the laminable members. Moreover, this is accomplished while the belts are moving, and even more particularly, it can be accomplished during high speed operation, that is, when the laminable members and the belts are moving at relatively high speeds. This is enabled by the fact that the belts are almost in a relatively friction free environment in that they are trained about the belt supporting framework through the use of air pockets or air bearings. Consequently, there is essentially little or no drag in the belts which impedes the speed of operation and moreover, also enables the belts to be brought into contact with this uniform pressure which is highly desirable in accordance with the present invention.

Due to the fact that metal belts, which are continuous have a transverse weld, any substantial flexing of the belts places a strain on the weld and places the latter under a high load. Thus, the weld would work, harden and crack, thereby rendering a relatively short life to the belt. Further, these belts are quite expensive to manufacture. The use of the air pockets to support the belt substantially overcomes this problem due to the fact that the belts do not have any substantial sagging portion and basically all portions of the belt are supported. Consequently, little or no strain is placed upon the weld.

It should be understood that a pre-curing mechanism similar to that employed in the apparatus A could also be employed in connection with the apparatus B as well. FIG. 10 schematically illustrates one form of pre-curing mechanism which may be used in connection with the apparatus B. In this case, a pair of metalic plates 335 are located on opposite sides of the longitudinal strands 256 to be applied to the upper surface of the laminable components. In like manner, a pair of metallic plates 336 are located on opposite sides of the longitudinal strands 258, which are to be applied to the lower surface of the laminable components. The pre-curing plates are preferably dielectric electrode plates and would be connected to a suitable source of dielectric energy in the manner as previously described. These plates would then initiate the cure of the resin matrix impregnated in the longitudinal strands. By virtue of the fact that these strands are immediately brought into contact with the helical or circumferential strands wrapped about the panels, the curing radiation would also be applied to the wrapped strands, therby initiating the pre-cure.

It is also possible to locate the pre-curing plates in relationship to the laminable components after the longitudinal strands have been applied to the wrapped strands, such as the helical or circumferential strands. However, in this case, there is a possibility that some steaming of moisture in the panels might result. Therefore, the arrangement as illustrated in FIG. 10 is preferred.

Due to the fact that the resin or binder impregnated in the reinforcing material is also in contact with the panels, this provides an effective means of tightly bonding the layers of reinforcing material not only to each other, but to the rigid panel as well. In this way, a very tightly laminated structure is obtained. Not only does the structure have the benefits of the strength of the wood material, such as the plywood sheet, but it also has the significantly added advantage of the reinforcing material applied thereto. Due to the fact that it is now possible to apply this reinforcing material to the wooden panels or other panels in a tightly adherent uniform manner, and particularly at a high speed of operation, these panels can now be used in many operations in which metal and other forms of panels were heretofore employed.

As indicated previously, the heated belts 280 and 288 may function as the final curing device in the apparatus. However, if desired, a similar radiation applicator 337, as for example, means for applying heat may be located down-stream of the belts 280 and 288. In this case, the radiation applicator 337 may be mounted on a frame 338 and be provided with a means for forcing the laminable members into contact with each other and for simultaneously applying a curing radiation thereto.

After the laminated structure has been completely bonded, it is then passed to an edge trim device 340 which is more fully illustrated in FIG. 6C of the drawings. The edge trim device 340 generally comprises a frame 342 and having an upper laminable structure receiving table 344. Mounted on the opposite longitudinal edges of the table 344 are pairs of cutting blades 346. These cutting blades 346 are located so that they are adapted to trim the edges of the laminated structure. Further, the edge trim device is comprised of a hold down plate 348 to avoid any vertical displacement of the laminated structure. The device 340 may also be provided with a control panel 350 for operation of the same. The edge trim device 340 may be provided with a suitable motor (not shown) typically mounted on the table 344 for operation of the blades 346. Again, this motor is preferably an electrically operable motor connected to a suitable source of electrical power for operation of the same.

Inasmuch as the edge trim device only trims the edges, but is not capable of removing the same, an edge separating device 352 is located down-stream of the edge trimming device 340. The edge separating device 352 is comprised of a support frame 354 and a pair of transversely spaced apart upstanding blades 356. It can be observed that the blades 356 diverge slightly on each of the opposite sides of the laminated structure and in this way, force the trimmed edges outwardly and away from the laminated structure. In essence, the blades 356 function as a type of wedging device.

Since the edges of the laminated structure have been removed, the apparatus B may also be provided with an edge sealer such as a sealing device 358 also illustrated in FIG. 6C of the drawings. The edge sealing device 358 is typically provided with a source of liquid seal under pressure as for example, a liquid resin, and which is thereafter applied to the edges of the laminated structure for sealing the same. For this purpose, a roller (not shown) would be provided for applying liquid sealer to the edges of the laminated members.

The apparatus B may also be provided with a suitable cut-off device 364 which is capable of cutting the laminated structure into discrete sections. Therefore, for this purpose the cut off device 364 is provided with a so-called traveling cross-cut saw 366 which moves transversely of a laminable structure to cut the same in discrete sections. The saw 366 is suitably mounted on a carriage 368 which shifts longitudinally with the laminated structure. Further, the carriage 368 moves at the same rate of speed as the laminated structure so that the saw 366 may make a completely straight cut.

Finally, the apparatus B may also be provided with a receiving table 370 located at the down-stream end of the cut off device 364 for receiving the discrete cut sections of the laminated structure. Finally, a stacking device (which is not shown) and which is conventional in its construction could also be employed as desired.

It is also possible to provide a modified form of continuous peripherally extending seal 380 on the periphery of the lower wall 304, in the manner as illustrated in FIG. 11 of the drawings. In this case, the remaining structure of the housing 300 is substantially identical to that previously described. The continuous seal 380 exists in the form of a metalic strip 382, which is welded or otherwise secured at point 384 to the lower wall 304. In this way, the continuous seal provides an interior chamber 386. Located within the chamber 386 is a tubular conduit 388 formed of a flexible material, such as a rubber hose, a flexible and stretchable plastic hose, or the like. This hose 388 is connected to a suitable source of air under pressure. In this way, the operator of the apparatus can control the amount of air introduced into the hose 388 and, hence, the overall size of the hose 388. In this way, the operator of the apparatus can also control the pressure with which the sealing strip 382 will contact the laminable components. It should also be understood that air inlet apertures 318 could also be provided for introducing additional air into the interior chamber 386, in the manner as illustrated in FIG. 11.

FIG. 12 illustrates one form of laminated structure M which may be produced by the apparatus B. In this case, the laminated structure M is comprised of interior rigid panel 390 having strands of fiber-containing reinforcing material 392 wrapped thereabout. The strands 392 may adopt a form of helically wound strands of reinforcing material. Disposed on the outer surfaces of the upper and lower set of strands 392 are longitudinal strands 394. Again, the strands 394 would actually be bonded to the strands 392 which are, in turn, bonded to the flat surfaces of the panel 390. Finally, a gel coat or similar protective coating 396 are located on the outer surfaces of the longitudinal strands 394. It should be understood that additional layers of longitudinal strands and/or helical strands or circumferential strands could be intermixed with or added to the various layers as described in connection with the laminated structuer M.

In one of the preferred embodiments, the strands 392 and longitudinal strands on one side of the panel, e.g., the upper or the lower side, with the binder impregnated therein, have a thickness of 15 mils to about 65 mils and preferably have a thickness of about 35 mils to 40 mils. The gel coating or the other surface sealing material on each side has a thickness of about 3 mils to about 28 mils and preferably from about 12 mils to about 20 mils.

Thus, there has been illustrated and described a unique and novel apparatus for producing a fiber reinforced plastic composite sheet structure which is constructed to create a gaseous pocket to urge laminable members into contact with each other and with substantially uniform pressure, and which therefore fulfills all of the objects and advantages sought therefor. It should be understood that many changes, modifications, variations, and other uses and applications of the method of making such structures will become apparent to those skilled in the art after considering this specification and the accompanying drawings. Therefore, any and all such changes, modifications, variations and other uses and applications which do not depart from the spirit and scope of the invention are deemed to be covered by the invention which is limited only by the following claims.

Having thus described my invention, what I desire to claim and secure by Letters Patent is:

1. An apparatus for producing a reinforced plastic composite article on a continuous basis, comprising:
   (a) means for continuously feeding through said apparatus a plurality of endwise abutted panels with each having a pair of spaced apart first edges and a pair of spaced apart second edges and relatively flat opposite surfaces;
   (b) winding means for winding a plurality of first strands of fiber reinforcing material about said panels in a direction which is at an angle to the direction of movement of said panels and which strands are in closely spaced relationship to one another about and around said pair of spaced apart first edges and across said relatively flat opposite surfaces, and where portions of said first strands extend across and between flat surfaces of two endwise abutted panels; and
(c) means for applying a plurality of second strands of fiber reinforcing material to the first strands on said relatively flat opposite surfaces of said panels and extending between the spaced apart second edges with a predetermined amount of tension on said strands and while said panels are continuously feeding through said apparatus, and where portions of said second strands extend across flat surfaces of two or more endwise abutted panels, said plurality of first strands and plurality of second strands having been impregnated with a curable binder which was cured and bonded to first and second strands and thereby bonding said first and second strands to one another to effect a woven strand sheet and to bond same to said panels.

2. The apparatus for producing the reinforced plastic composite article of claim 1 further characterized in that said combination of first and second strands and binder have a thickness of about 15 mils to about 65 mils.

3. The apparatus for producing the reinforced plastic composite article of claim 1 further characterized in that the combination of first and second strands and binder have a thickness of about 35 mils to about 40 mils.

4. The apparatus for producing the reinforced plastic composite article of claim 1 further characterized in that said winding means winds said first plurality of strands in a direction generally transversly to the direction of movement of said panels in continuous loops, and said means for applying is constructed to apply said second plurality of strands longitudinally to said opposite flat surfaces.

5. The apparatus for producing the reinforced plastic composite article of claim 4 further characterized in that said binder is a resin matrix.

6. The apparatus for producing the reinforced plastic composite article of claim 4 further characterized in that said apparatus comprises means for applying a layer of surface sealing material on each of the fiber reinforcing materials on each of the opposite relatively flat surfaces of said panels and rigidly bonding same thereto.

7. The apparatus for producing the reinforced plastic composite article of claim 6 further characterized in that the combination of first and second strands and binder have a thickness of about 15 mils to about 65 mils and that the surface sealing material has a thickness of about 3 mils to about 28 mils.

8. The apparatus for producing the reinforced plastic composite article of claim 6 further characterized in that the combination of first and second strands and binder have a thickness of about 35 mils to about 40 mils and that the surface sealing material has a thickness of about 12 mils to about 20 mils.

9. An apparatus for producing a reinforced plastic composite article on a continuous basis comprising:
(a) means for continuously feeding through said apparatus a plurality of endwise abutted rigid panels with each having a pair of spaced apart first edges and a pair of spaced apart second edges and relatively flat opposite surfaces,
(b) means for wrapping a plurality of first strands of fiber reinforcing material about said rigid panels in a direction which is at an angle to the direction of movement of said panels and which strands are in closely spaced relationship to one another about and around said pair of spaced apart first edges and across said relatively flat opposite surfaces, and where portions of said second strands extend across flat surfaces of two or more endwise abutted panels,
(c) means for applying a plurality of second strands of fiber reinforcing material to the strands on the opposite flat surfaces of said panels and extending between the spaced apart second edges with a predetermined amount of tension on said strands and while said panels are continuously feeding through said apparatus, and where portions of said second strands extend across flat surfaces of two or more endwise abutted panels, said plurality of first strands and plurality of second strands having been impregnated with a curable binder,
(d) curing means for applying a curing energy to the binder for curing the binder and bonding the binder impregnated first and second strands to one another to effect a woven strand sheet extending for the entire surface area of at least two of the panels and bonding same to said panels to form a panel segment with woven strand sheets bonded thereto, and
(e) means for servering the panel segment from a continuous string of abutted panels so wrapped to form the reinforced plastic composite article.

10. The apparatus of claim 9 further characterized in that said means for wrapping comprises winding means for winding said plurality of first strands in a direction generally transversely to the direction of movement of said panels in continuous loops, said means for applying is adapted to apply said plurality of second strands longitudinally to the first plurality of strands on the opposite flat surfaces.

11. The apparatus of claim 9 further characterized in that said binder is a resin matrix.

12. The apparatus of claim 9 further characterized in that said apparatus comprises means for impregnating said first and second strands with a curable binder.

13. The apparatus of claim 12 further characterized in that said apparatus comprises means for applying a layer of surface sealing material to each of the fiber reinforcing materials on each of the opposite relatively flat surfaces of said panel and rigidly bonding same thereto.

* * * * *